US011553253B2

(12) United States Patent
Gips

(10) Patent No.: US 11,553,253 B2
(45) Date of Patent: Jan. 10, 2023

(54) SYSTEM AND METHOD FOR DIRECT OPERATOR TO SET-TOP BOX COMMUNICATION

(71) Applicant: Intraway R&D S.A., Montevideo (UY)

(72) Inventor: Hernan Gips, Buenos Aires (AR)

(73) Assignee: Intraway R&D, S.A.

( * ) Notice: Subject to any disclaimer, the term of this patent is extended or adjusted under 35 U.S.C. 154(b) by 0 days.

(21) Appl. No.: 16/548,086

(22) Filed: Aug. 22, 2019

(65) Prior Publication Data

US 2020/0068263 A1     Feb. 27, 2020

Related U.S. Application Data

(60) Provisional application No. 62/721,081, filed on Aug. 22, 2018.

(51) Int. Cl.
*H04N 21/236* (2011.01)
*H04N 21/4788* (2011.01)
*H04N 21/418* (2011.01)
*H04N 21/4147* (2011.01)
*H04N 21/488* (2011.01)

(52) U.S. Cl.
CPC ..... *H04N 21/4788* (2013.01); *H04N 21/4147* (2013.01); *H04N 21/4182* (2013.01); *H04N 21/4882* (2013.01)

(58) Field of Classification Search
CPC ........... H04N 21/4788; H04N 21/4147; H04N 21/4182; H04N 21/4882; H04N 21/2351; H04N 21/26216; H04N 21/4353; H04N 21/4516; H04N 21/23617; H04N 21/2362; H04N 21/6543; H04N 21/42684
See application file for complete search history.

(56) References Cited

U.S. PATENT DOCUMENTS

| | | | | |
|---|---|---|---|---|
| 2004/0015984 | A1* | 1/2004 | Yamamoto | H04N 7/17318 725/28 |
| 2010/0198929 | A1* | 8/2010 | Huckins | H04N 21/23614 709/206 |
| 2013/0326553 | A1* | 12/2013 | Nicolas | H04N 21/4383 725/25 |
| 2014/0281537 | A1* | 9/2014 | Okimoto | H04N 21/26606 713/168 |

(Continued)

*Primary Examiner* — John R Schnurr
(74) *Attorney, Agent, or Firm* — Peter A. Nieves; Nieves IP Law Group, LLC

(57) ABSTRACT

A system and method implements communications between a TV operator's infrastructure and set-top boxes (STBs) through a TV operator's infrastructure, wherein the infrastructure includes at least one Conditional Access System (CAS), a messaging engine and a Set Top Box (STB), the STB including a unique identification value. The method comprises receiving a structured message in the messaging engine; computing a stream out of multiple received structured messages by the messaging engine and sending to the multiplexor; including the stream of structured messages in a broadcasted signal transmitted through the TV operator's infrastructure; receiving the broadcasted signal by the STB and extracting a structured message; and comparing addressing information in the extracted structured message with a unique identification of the STB. Messages directed to the STB can be displayed.

3 Claims, 4 Drawing Sheets

(56) References Cited

U.S. PATENT DOCUMENTS

2014/0359658 A1* 12/2014 Yoshida ............... H04N 21/435
                                                      725/32
2016/0173347 A1*  6/2016 Rajapakse ............. H04L 65/60
                                                      709/224
2019/0297376 A1*  9/2019 McCarty ............ H04N 21/4318

* cited by examiner

SYSTEM AND METHOD FOR DIRECT OPERATOR TO SET-TOP BOX COMMUNICATION

CROSS-REFERENCE TO RELATED APPLICATIONS

This application claims the benefit of U.S. Provisional Patent Application Ser. No. 62/721,081, filed Aug. 22, 2018, entitled "System and method for direct operator to set-top box communication," which is incorporated by reference herein in its entirety.

FIELD OF THE INVENTION

The present invention relates to telecommunications and more particularly is related to a system for sending messages in a digital television (TV) network from a TV operator to one or more set-top boxes.

BACKGROUND OF THE INVENTION

Digital television (DTV) refers to the transmission of television signals, including the sound channel, using digital encoding, in contrast to earlier analog television technology, in which the video and audio are carried by analog signals. DTV is an innovative advance that represents the first significant evolution in television technology since color television in the 1950s. Digital TV transmits in an image format called high definition television (HDTV), with greater resolution than analog TV, in a widescreen aspect ratio similar to recent movies in contrast to the narrower screen of analog TV. Digital television is implemented according to different standards including, but not limited to, the Digital Video Broadcasting (DVB) in Europe, Australia and New Zealand, and the Advanced Television System Committee (ATSC) in the USA, Canada and Mexico.

Digital TV delivers a signal via terrestrial transmitters ("signal sources") using an antenna, digital cable or digital satellites. DTV viewers typically include paying customers ("subscribers") for a provider ("TV operator"). The digital TV signal is broadcast, meaning that the same signal is transmitted unidirectionally to all the subscribers from the TV operator. A receiver ("set-top box" (STB)), is loaned, leased, or sold to the subscriber.

In brief, according to Conditional Access ("CA") protocols the TV operator has a set of audio/video signals, which may be encoded using the mpeg2 standard, and information signals which include, but are not limited to, subtitles. These signals may be scrambled, meaning they are encrypted with specific cryptographic algorithms and according to a specific key-generation procedure. This is done by a Conditional Access System ("CAS" system). A CAS system is a device sold in the market by different vendors.

The scrambled signals, a CA messages signal (also known as the CAS carousel), and a channel guide are fed to a multiplexor system, which returns a single signal that is transmitted through a "data transmitter" to the subscribers. This signal is called the broadcasted signal. Here the data transmitter depends on whether the DTV network is a cable network satellite and other details. The set-top boxes ("STBs") in the network are able to receive this broadcasted signal.

STBs are connected to a TV set or a digital video recorder; this arrangement allows the subscriber to select which channel to view on the TV. STBs may also perform other features such as the recording of TV content (e.g., recording channel 571 from 6 pm to 8 pm) and viewing previously recorded content.

An STB receives the broadcasted signal through an external source of a signal, and extracts all the video and audio signals, the channel guide and the CA messages through a demultiplex process. The channel guide signal contains streams of data tables which specify service information as described below and enumerates all the available TV channels and how to locate the (demultiplexed) video and audio signals for these channels, as well as subtitles and other information.

For practical purposes, some details are reproduced here from the DVB standard (["Digital Video Broadcasting (DVB), which are incorporated herein by reference in their entirety; Specification for Service Information (SI) in DVB systems" (EN 300 468 V1.3.1 (1998-02)): pages 10-11]):

Program Specific Information (PSI) data provides information to enable automatic configuration of the STB to demultiplex and decode the various streams of programs within the multiplex. The PSI data is structured as four types of tables, each of which is transmitted in sections:

1. Program Association Table (PAT): for each service in the multiplex, a PAT indicates the location (the Packet Identifier (PID) values of the Transport Stream (TS) packets) of a corresponding Program Map Table (PMT). It also gives the location of the Network Information Table (NIT).
2. Conditional Access Table (CAT): the CAT provides information on the CA (conditional access) systems used in the multiplex; the information is private (not defined within the present document) and dependent on the CA system, but includes the location of the entitled management message (EMM) stream, when applicable.
3. Program Map Table (PMT): the PMT identifies and indicates the locations of the streams that make up each service, and the location of the Program Clock Reference fields for a service.
4. Network Information Table (NIT): The NIT table provides information about the physical network. The syntax and semantics of the NIT are defined below A hard coded PID table assigns a PID value to each table name, e.g., PAT=0x0000, CAT=0x0001.

The STB also receives input from a remote control or buttons and control on the STB. In particular, the STB receives a selected TV channel. When the STB is asked to select a TV channel, it can access tables to find, within the demultiplexed signals, which are the specific audio and video signals for the selected TV channel. These demultiplexed audio and video signals may be (cryptographically) encrypted, and hence cannot be processed immediately.

In case the audio and video signals are scrambled (encrypted), they are encrypted using short-term (temporary) cryptographic keys which are negotiated according to a cryptographic protocol. The protocol is specified within the Conditional access, also referred to as the Conditional Access System (CAS), standards. The CAS is preferably compliant with the DTV standard that is used by the TV operator. In the market, there are multiple conditional access systems compliant with the DTV standards.

CAS protocols allow the entity delivering content (in this case the TV operator) to control which STBs can access selected content. Different CAS protocols are used throughout the world: for example, in the United States and Canada, the protocols are developed under the standards defined by Cablelabs, and in Europe under standards established by European Union directive.

The CAS protocol includes a method for a) cryptographically encrypting the content before it is broadcasted, b) delivering the cryptographic keys to each subscriber to access their authorized content, and c) decrypting the content at the STB for the subscriber (provided access has been supplied for this content). The STB includes a special-purpose module called the "conditional access module (CAM)" which takes part in this protocol. The CAM is a tamper-resistant electronic device that typically holds a smart card with cryptographic keys for the TV operator and the subscriber. The CAM performs the logical operation to decrypt encrypted content.

A TV operator can send a message to one or more of its subscribers. Two channels are not encrypted and available for this purpose, the channel guide and the CAS carousel, which is a signal used by the CAS for activating and deactivating a channel for all its subscribers and for adding pay-per-view content, among other tasks. This is the channel which carries the aforementioned cryptographic keys. In a typical setting, the bandwidth required to deliver all this content is close to all that is available.

It could be said that the messages in a CAS carousel can be divided into two categories: the business-critical messages on one side, which includes activations, deactivations and pay-per-view services, and on the other side marketing-related and other secondary messages. A subscriber ordering a new service, or a pay-per-view content piece, generally expects the ordered content to be delivered immediately. This is to say, messages in the business-critical category are of higher priority than the messages in the second category. Hence, since the bandwidth available for messaging within the CAS carousel is seriously limited, it may occur that messages from both categories cannot be transmitted with the expected speed.

Moreover, it is not uncommon for a TV operator to have more than one CAS system, for instance, because the TV operator provides STBs from different vendors and each STB is only compatible with an associated CAS. In this case, TV operators require a tool, called the simulcrypt module, to integrate the multiple CAS (so that all the STBs are able to process the CAS carousel). However, simulcrypt does not support messaging and hence, the TV operator cannot deliver messages using one tool for more than one CAS.

Therefore, there is a need in the industry to address one or more of the aforementioned shortcomings.

SUMMARY OF THE INVENTION

Embodiments of the present invention include a system and method for providing direct operator to set-top box communication. The system and method implements communications between a TV operator's infrastructure and set-top boxes (STBs) through a TV operator's infrastructure, wherein the infrastructure includes at least one Conditional Access System (CAS), a messaging engine and a Set Top Box (STB), the STB including a unique identification value. The method comprises receiving a structured message in the messaging engine; computing a stream out of multiple received structured messages by the messaging engine and sending to the multiplexor; including the stream of structured messages in a broadcasted signal transmitted through the TV operator's infrastructure; receiving the broadcasted signal by the STB and extracting a structured message; and comparing addressing information in the extracted structured message with a unique identification of the STB. Messages directed to the STB can be displayed.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

DETAILED DESCRIPTION

An exemplary system embodiment of the invention includes a messaging engine, at least one modified Set-Top Box (STB), at least one Conditional Access System (CAS for short), a multiplexor, and a network and network equipment, these capable of taking a "broadcasted signal" generated by the multiplexor and feeding it to the input of each STB. One of ordinary skill in the art would appreciate that the CAS, multiplexor, and network equipment may be considered as included within a TV operator infrastructure. The infrastructure allows the TV operator to send the broadcast signal, generated by the multiplexor, to every STB.

The messaging engine generates one (or possibly more, if configured) signal encoding a sequence of messages. A message signal may be implemented, for example, as a sequence of structured tables in a format similar to those used by the channel guide.

The multiplexor then generates the broadcast signal as the multiplex of the audio and video signals (possibly scrambled), the channel's guide, the CAS carousel and the messaging signals. The resulting broadcast signal is transmitted by the data transmitter of the multiplexor and reaches all the set-top boxes connected to the network.

The STB extracts messages, one by one, from the messaging signals as they are received. Each message received has an address field, which is analyzed by a STB addressing procedure. The STB addressing procedure is defined in more detail hereafter. Firstly, this procedure determines whether the message is destined to this STB by comparing the address field with the STB's identification number (ID). When the message is destined to the STB, the STB displays the message for the subscriber to read. It is noted that the message could be for displaying immediately, at a later time, or even directed to a component in the STB (e.g., the PVR video recorder) so it would not be displayed.

Figure 1:
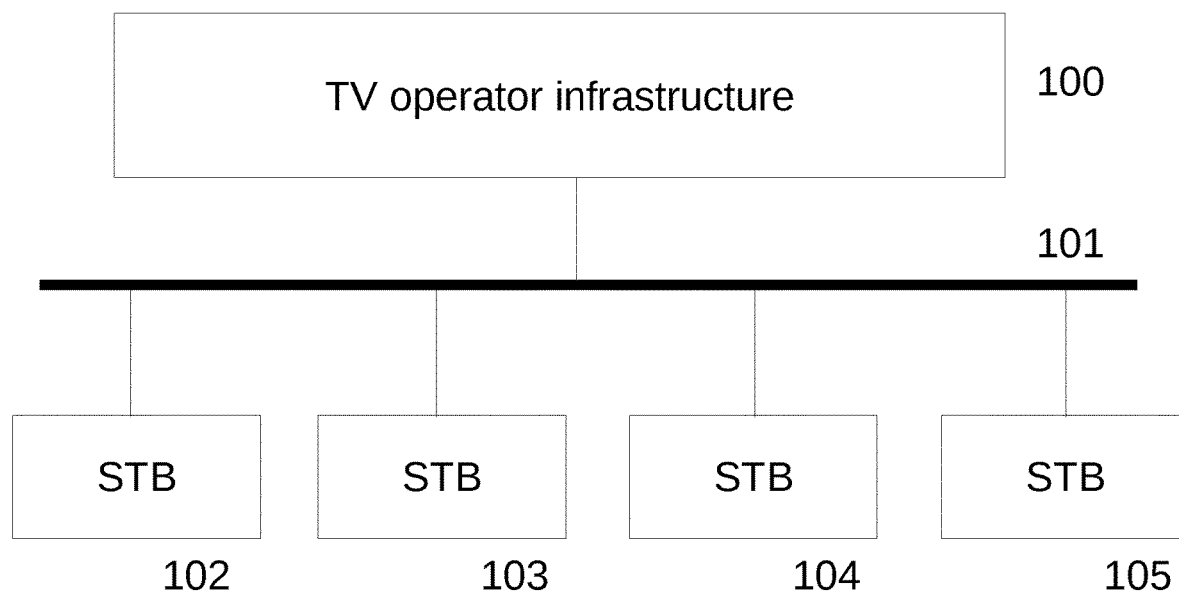
FIG. 1 is a schematic diagram illustrating an exemplary TV operator network, in accordance with the present invention.

FIG. 1 depicts an exemplary TV operator network. In this network, a broadcasted signal is transmitted to all the STBs (102, 103, 104, 105) connected to the network (101) from the TV operator infrastructure (100). Of course, more or fewer STBs may be provided and the network topology may differ.

Figure 2:
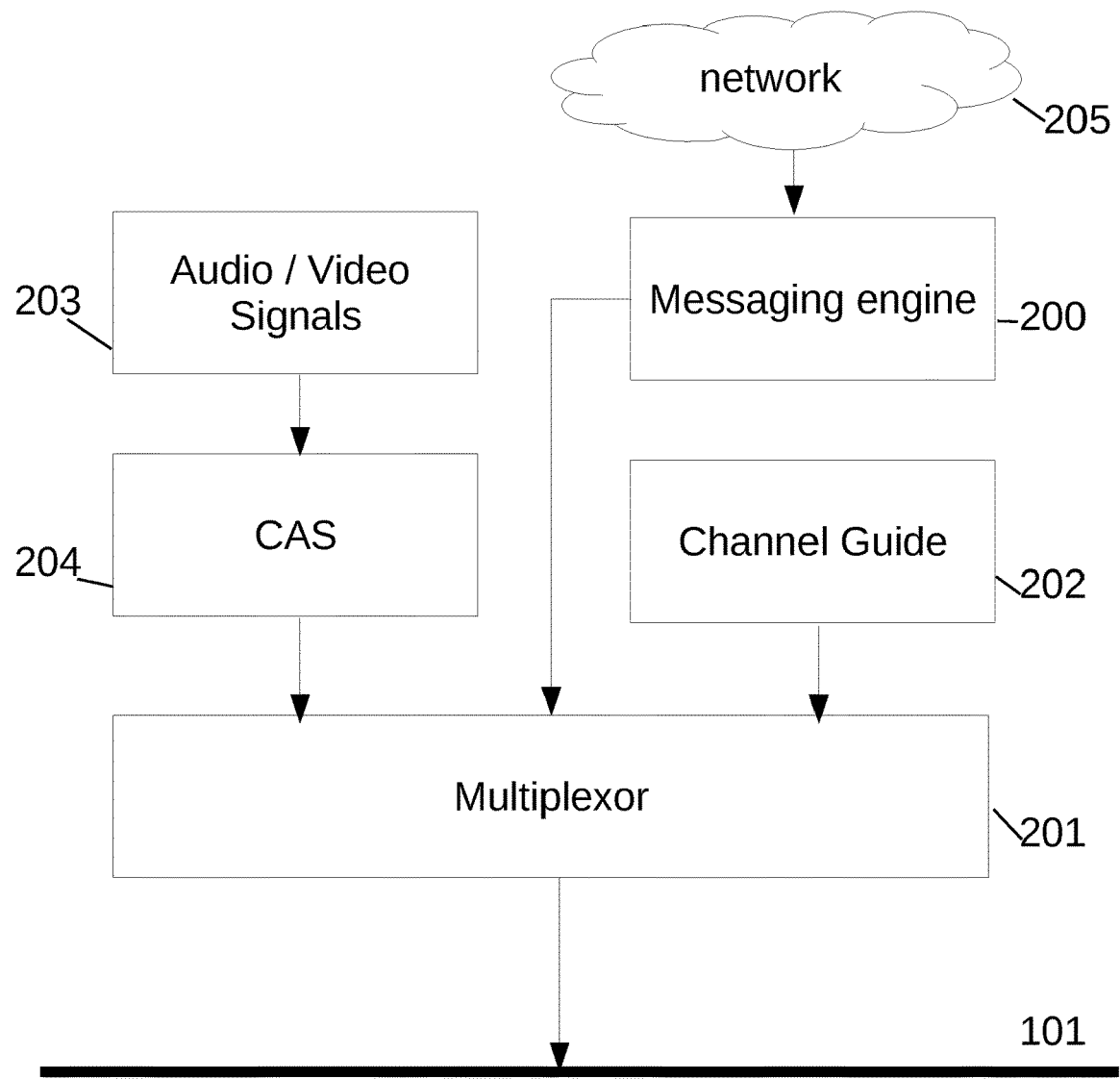
FIG. 2 is a schematic diagram illustrating use of a messaging engine within the present system and method.

FIG. 2 depicts a messaging engine (200) that generates one or more message signals. The messaging engine 200 exposes an Application Program Interface (API) over a network 205, e.g., a data network within the TV operator's infrastructure, or even the Internet. These message signals are fed to the multiplexor 201. The video and audio signals 203 are scrambled at the CAS 204 and sent to the multiplexor 201. A channel guide 202 signal is also fed to the multiplexor 201. The multiplexor 201 returns a single signal, referred to as a broadcast signal, which is a multiplex of the signals from the channel guide 202 and audio/video signals 203 and perhaps other signals, and it is transmitted through the network 101. It is noted that the broadcast signal may be generated by variations of this procedure, which would be known to those having ordinary skill in the art.

Figure 3:
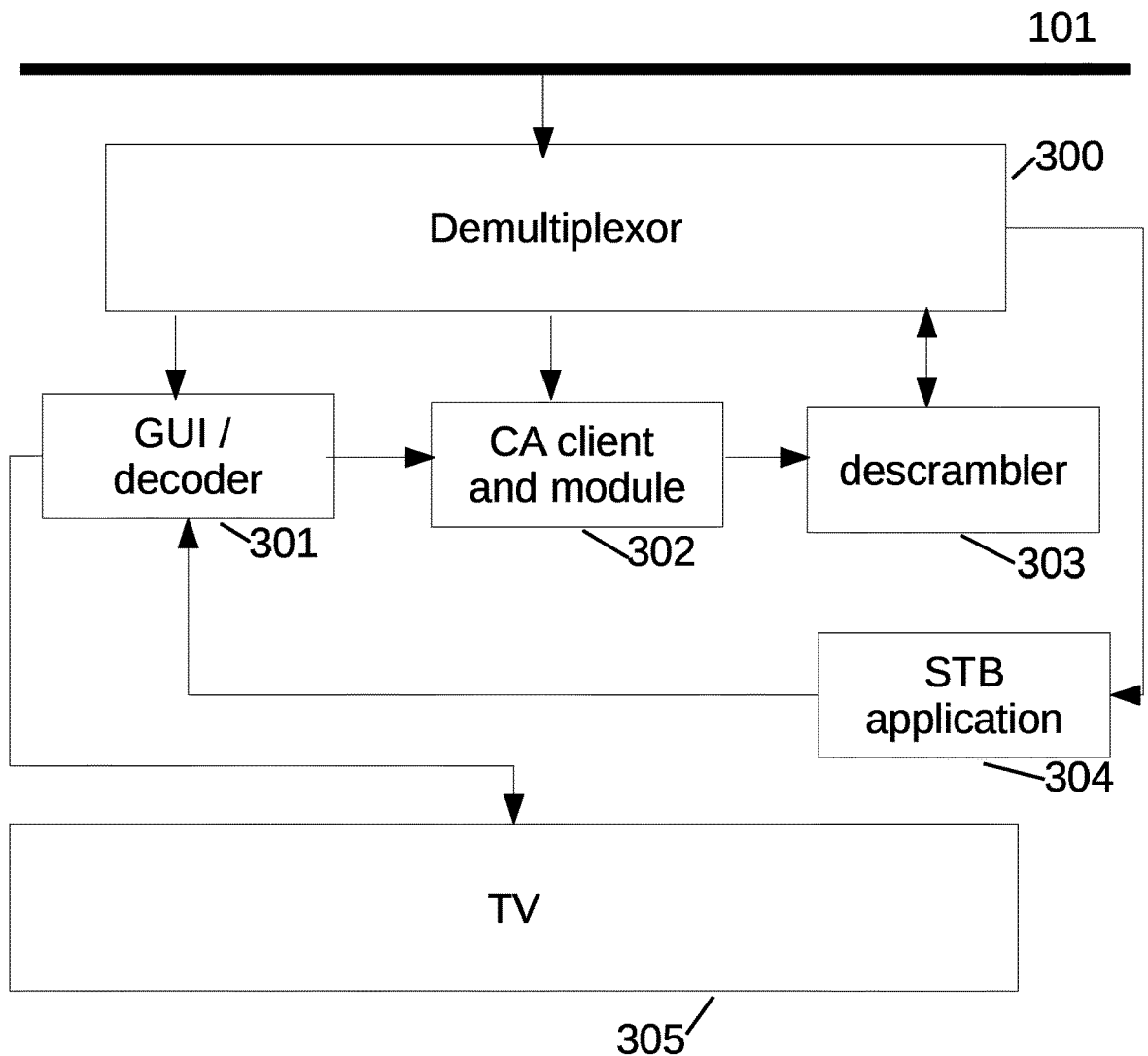
FIG. 3 is a schematic diagram illustrating a set-top box (STB) that receives a broadcast signal from the multiplexor of FIG. 2.

FIG. 3 depicts a set-top box (STB) that receives the broadcast signal. A demultiplexor 300 individualizes the video and audio signals (scrambled or not scrambled), the information signals, the channel guide signals, the CAS carousel and the message signals. Specifically, after the STB demultiplexes the broadcast signal into several signals, it looks for a signal encoded in a specific band. This specific band has been hardcoded into the STB before the subscriber receives it. The channel guide is transmitted in this band. Using the channel guide, the STB can individualize all the other demultiplexed signals. As is standard in any DTV setting, a CA client and module 302 reads the CAS carousel signals, extracts the necessary cryptographic information, and feeds it to a descrambler 303. The descrambler 303 receives scrambled signals and cryptographic information and produces (descrambled) audio, video and information signals. These signals are decoded and sent to the TV by the decoder 301. The STB application 304, running in the STB, receives the message signals and, based on comparing the message type and address with internal information, it decides if the message is destined to this STB and how to process the message. The STB application 304 then sends messages to-be-displayed and other output to the GUI 301, which may display the messages in the TV 305 which is located external to the STB, interact with a Personal Video Recorder (PVR) module (within the GUI 301 of the STB), or perform other tasks. It is noted that PVR module is optional, and therefore, is not illustrated in FIG. 3.

Figure 4:
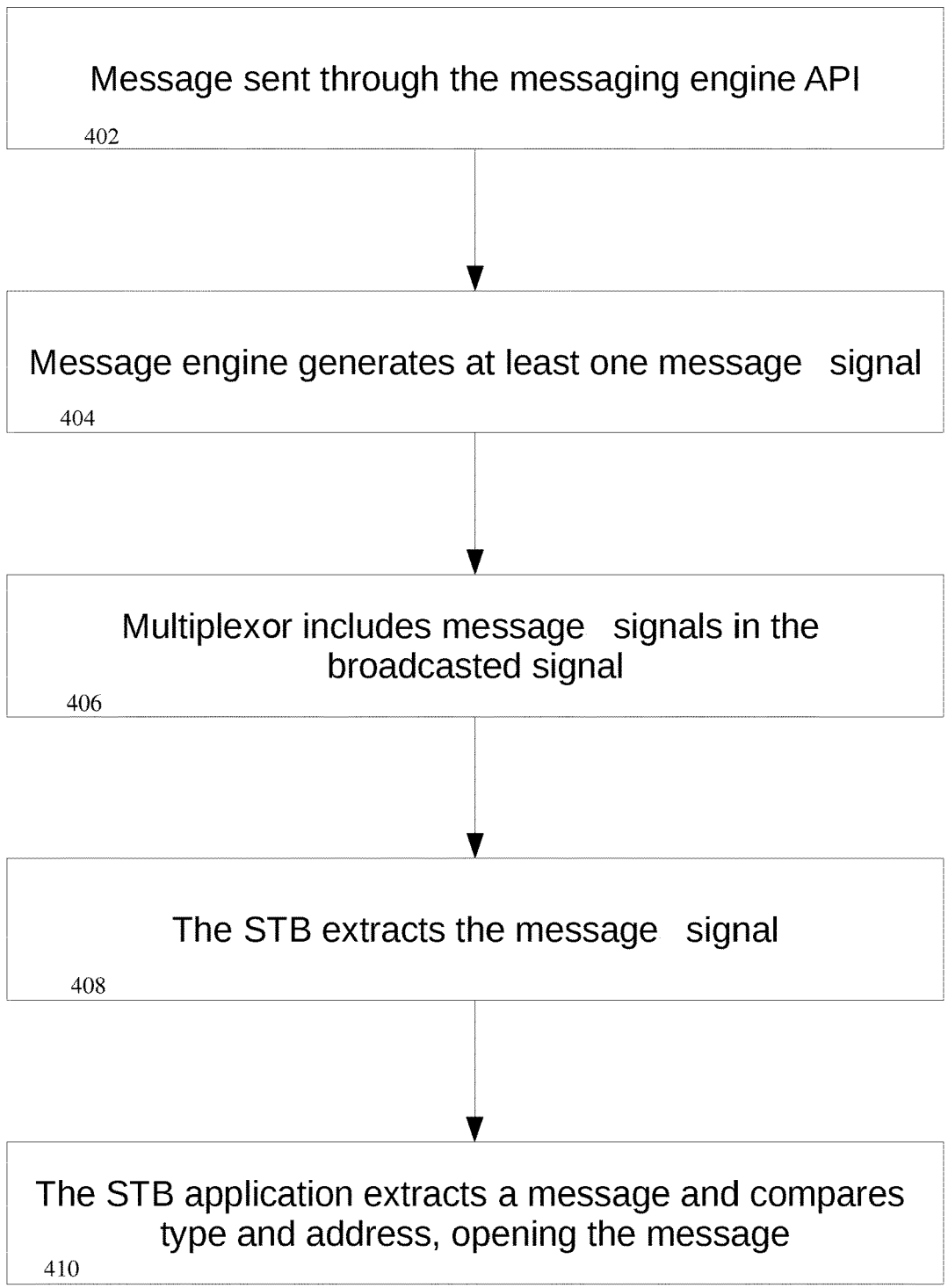
FIG. 4 is a flowchart illustrating steps taken by the present system in the transmission and processing of a message through the messaging engine of the present invention.

FIG. 4 is a flowchart 400 that illustrates steps taken by the present system in the transmission and processing of a message through the messaging engine of the present invention. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

The process illustrates a process by which a message is sent to the messaging engine API, the messaging engine creates at least one message signal, the message signal including a sequence of structured messages, and the multiplexor includes these message signals into the "broadcasted signal," which is transmitted through the TV operator's network to be received by an STB. The STB demultiplexes the broadcasted signal to extract the message signals, and the STB compares the message type and address to decide whether the message should be opened, and opens the message in case it does.

The messaging engine 200 receives messages through an API in a predefined format, for instance, but not limited to, in the extensive markup language also called XML (block 402). The API is exposed in a network 205. In one embodiment of the present system and method, a component, called the messaging application, possibly running in a web server located with the network 205 allows a user acting on behalf of the TV operator to input messages. The messaging application may be implemented, for example, as a web application that users (this could be employees) access through a web browser from a computer or tablet. Within this application, the user can type into a web form the value for the different fields that constitute a message. The messaging application then encodes the message into the format supported by the messaging engine API and calls the API with this message, e.g., through a request.

Moreover, subscribers may be allowed to send messages with restrictions, for example, when the network 205 is the Internet or a network to which subscribers have access. That is, the subscribers may access a version of the messaging application with restricted features (e.g., a subscriber may only send removable messages to a single user at a time, with a given maximum size). For example, a subscriber logs into the web application, chooses a recipient subscriber within a directory, writes a message for the recipient subscriber and presses send.

The messaging engine can be configured to generate one or more message signals (block 404). A message signal encodes messages one after the other, where repetitions are allowed. These messages are encoded in a predefined format. In one embodiment of the present invention, messages are encoded as tables with predefined attributes, as described herein. One having ordinary skill in the art will understand how modifications of this format provide a similar functionality.

At least one new signal is created by the messaging engine, each signal encoding a stream of bytes. The number of signals is configured in the application by the TV operator user. Each of these signals is delivered to the multiplexor which encodes them into unoccupied frequencies. The frequency is assigned a channel ID and the channel ID is encoded into the STB.

The messaging engine maintains a queue of messages to be sent. These messages can include a priority and the queue may be a priority queue. The messaging engine then includes in the stream the messages with the higher priority first. Since the bitrate in which the signal that includes the data stream is fixed, the messaging engine sends messages one after the other. When no message is ready for delivery, the messaging engine can retransmit the templates. An embodiment of this invention allows the TV operator to predefine a set of "templates" which are messages that are sent often to different subscribers with, perhaps, minor variations. Examples include, payment notices and special offers. More details follow. Alternatively, the messaging engine may handle a nothing-to-transmit message.

The format, e.g., table format, needs to be specified a priori so that: a) the messaging engine can create the tables with this format, and b) an STB application can parse these tables and extract the information unambiguously.

The messaging engine may encode messages and other control commands received in a unit called "table", or more explicitly a custom Digital Video Broadcasting (DVB) table. A table may be merely a sequence of bytes, starting with a table type, i.e. one of the six table types described below, followed by a sequence of attributes called descriptors. The next attributes include the section length descriptor, which establishes the length in number of bytes for the preceding piece of the message, and a hash or CRC (cyclic redundancy check) of the table (excluding table type, length and the CRC itself).

The attributes with which the table starts can be used to reconstruct the table from the bytes stream at the receiving end, so that the STB and messaging application are synchronized. Someone skilled in the art may know how to implement a process for encoding a message into a table on one end of a communication and later receiving the table and decoding the message. The table may include descriptors or attributes with pre-specified sizes and orderings which make it possible to produce tables from messages and messages from tables.

In accordance with the first embodiment of the invention, the system uses six types of tables to handle and filter messages:

1. An Individual Message Table (IMT) for transmission of messages which are sent once to a single user, a group of users or all the users.
2. A Message Templates Table (MTT) is used for transmission of message templates which can be addressed to multiple recipients where each user may receive an instantiated version of this template. A template consists in the text which is common to multiple recipients and it has keys, which act as placeholders, for the part which varies from recipient to recipient.
3. A Message Recipient Table (MRT) defines recipients and data that are unique for this user or user group (parameters). For example, it includes a set of subscriber IDs and the instantiated information for these recipients (when this is required).
4. A Video Recording Table (VRT) for transmission of messages to the PVR component in each STB.
5. A Message Subscription Table (MST) for transmission of a bitmask to each STB. This bitmask is used to create logical groups for sending specialized content. For example, the TV operator includes a bitmask (or group ID) and the set of all the IDs of the subscribers which belong to this group. Later the TV operator may send messages to these groups.
6. A Channel Filtering Table (CFT) for transmission of the channels on which a message should not be displayed on screen (i.e., if a pop up or scroll message is received when the filtered channel was on tune, then the message should not be displayed).

Format of the table is described in further detail below. Each table may include a descriptor, which may or may not be compressed, and an integrity tag (e.g., CRC) used to validate the integrity of the message.

The Address Message Descriptor

Messages may address one or more subscribers. The tables of type IMT, MTT, VRT and CFT have an address field. The address field can be used to specify to one recipient, a group of recipients, a range of recipients (as defined by consecutive STB IDs) or broadcasted to all. Recipients are selected among the STBs. More specifically, the address field may contain three subfields: address type, address length, and address data. The address field is written using the following logic.

1. When the message has the "broadcast" address type, the other subfields are ignored. The message is to be displayed to all the subscribers.
2. When the message has the "group" address type, it uses 4 bytes to establish the address length and the address data field contains a bitmask. Independently of this table, the messaging engine sends in another table a set of subscriber IDs that are associated to each bitmask (see below).
3. When the message has the "single" address type, the 4-bytes address length establishes the length of the address field which is the STB ID for the recipient of the message.
4. When the message has the "range" address type, it uses 8 bytes for the address data where the first 4 bytes include the start STB ID and the last 4 bytes include the last STB ID in the range. The message is to be addressed to all STB whose ID falls within this range.

Other Message Descriptors

The messages (e.g., tables) may include some or all of the following fields:

1. Message type descriptor: Define if the message is to be stored, popup, scroll or to remain non-removable. It also defines if the message must appear after the STB is turned on or woken up from the standby state, and if the message must be displayed over a black background and remain until the user removes it, or if the STB is to be tuned to a specific channel by the TV operator. In that case, the STB is turned on to that channel, the message is displayed, and the STB does not allow the subscriber to change the channel.
2. Message removed descriptor: This field defines if the STB must remove the message after it is viewed. It is also used to remove a video recording or stored video immediately.
3. Message text descriptor: This field includes the message text encoded using UTF-8 encoding. Fields may have a size limit, e.g., 255 in one implementation, and if the intended message text does not fit in this length, it must be split in several message text descriptors. The table which includes a message text descriptor also has a section number field and a last section number field. Assume a message is split in 12 sections: then it is transmitted in 12 tables where the first piece has section number equal to 1 and it increases one by one until the last piece, which has section number equal to 12; in the example the 12 tables have last section number equal to 12. This helps the STB to reconstruct the message.
4. Message parameters descriptor: this includes a parameter index (e.g., a message template may contain at most 256 parameters, which are indexed from 0 to 255) and the parameter text encoded using UTF-8 encoding. Again, if the parameter text sent through the messaging engine is bigger than the maximum, it is split in several message parameter descriptors which should be placed one after the other.
5. Message title descriptor: This field includes the message title encoded using UTF-8 encoding. Again, if the text sent through the messaging engine is bigger than the maximum, it is split in several descriptors which should be placed one after the other.
6. Message footer descriptor: This field includes the message footer encoded using UTF-8 encoding. Again, if the text sent through the messaging engine is bigger than the maximum, it is split in several descriptors which should be placed one after the other.
7. Message scroll descriptor: This field indicates that the message scroll loop must be turned on or off; if on, it defines a scroll speed (e.g., 8 speeds are defined going from slow to fast), the scroll location which describes if the message is to be displayed at the top or bottom of the screen; and scroll force which specify a timeout for the scrolling to end, and a Boolean specifying whether the user can exit the message before it times out.

8. Message inbox descriptor: specifies the name of an inbox. When a message is received by a STB, other than displaying this message, the STB stores the message in an inbox with this name. A description of how the subscriber accesses the inbox application follows in the next section.
9. Message schedule descriptor: specifies a start date-time and an end date-time. The user can only view the message between these times and dates.
10. PVR pairing descriptor: it contains a 64-bit value which is translated to a QR code and shown on screen during a pairing process.
11. PVR management descriptor: used for enabling and disabling the PVR capability and the remote PVR capability, or to remove all the PVR content from the STB. For example, if an STB receives a message to remove all PVR content, then it will delete all the content from storage.
12. PVR schedule descriptor: This is used either to remind the user that he wants to view a program (at a given time and channel) with a popup message, or to record the program in a given channel starting at a given time and for a given duration.

Formatting

Furthermore, the message text descriptor may be modified according to formatting specifications as follows:

Format: A format is specified. The message can be part of a text message (e.g., ASCII or UTF-8), rich text message or an image. Depending on the file format, messages may include different fonts.

Text. The text of the message. The message may further include some standard (rich text) formatting options, for example, underline, italic, and bold face.

Timing: The message may include the time and date when the message should be displayed. For example, by selecting a start time and an end time. If the subscriber uses the STB within that period, then the message is to be displayed, but is not displayed otherwise.

Pagination and scrolling: Messages can be spread in different "pages". That is, depending on the TV, message format, and STB the screen allows a maximum number of characters to be displayed. Long messages are thus split in pages. This message field establishes for example if the text is to scroll automatically and at what scrolling speed.

Removable or non-removable: This field establishes if the recipient may or may not remove the message after he has read it, or if the message must persist for a specified (or unlimited) time until a remove event happens. For example, the TV operator may decide to show a message saying that a specific user should pay his outstanding bills to get back the services and leave this message permanently blocking the broadcasted content until the bill is payed. These messages are termed removable and non-removable messages, respectively. Once a removable message is displayed, the STB marks the message as viewed. A message may be set as viewed after a prescribed time or when the subscriber closes the message with his remote control.

Individual Message Table (IMT)

The IMT table is used for a message that is only sent once, and can be addressed to one or more subscribers. The specification includes at least a table ID field, a section number (and a number of sections field), an address field, and a compression tag. It may also include other descriptor types, including but not limited to: a message title descriptor, message text descriptors, message footer descriptor, message type descriptor, message removed descriptor, message scroll descriptor, message inbox descriptor, message schedule descriptor.

Message Template Table (MTT)

The message template table is used to transmit one un-instantiated template. A template has no address. It contains a template ID which can be used to refer to it and one or more descriptors (e.g., message text descriptors), the template version number, the section ID and the total number of sections used, plus some field descriptors. These include but are not limited to: message title descriptor, message text descriptor.

Templates can have different versions. They are identified by a version number which is increased from 0 to the field limit (and then reset to 1). These version numbers are used by the STB to decide when it needs to update a template.

An (MTT) template is analogous to a simple message, but it has no address field, and it may include one or more placeholders for parameters. Placeholders are established by a special syntax: for example, a reserved character followed by a label. For example, this:

Dear % Salutation % SubscriberSurname,

We want to remind you of your outstanding bill for the amount of $ % amount

. . . .

where "% Salutation" and "% SubscriberName" are both placeholders (the special character being %), and the rest is fixed text.

The messaging engine keeps a list of templates that are identified by template IDs. For example, the messaging engine may be configured to 10 templates. The TV operator can set these templates at any time through the messaging application. The messaging engine ensures that these templates are periodically sent to all STBs.

Templates are used to save bandwidth. In brief, an MTT is first sent with the message template, and then an MRT is sent each time the template is to be instantiated, the MRT establishing the recipients of the instantiated template and the values for the placeholders.

Message Recipient Table (MRT)

The message recipient table (MRT) is used to instantiate a template to one or more recipients. Briefly speaking, it specifies which template should be sent to whom and how to replace parameters.

The MRT includes a header field, an address field, a version number, the section number and last section number and the template ID. It further includes field descriptors. In particular, it includes one message parameter descriptor per parameter in the template. For example, the message template (transmitted earlier in an MTT) includes the three parameters %00, %01 and %02, and the MRT contains three message parameter descriptors that instantiate these parameters.

Message Subscription Table (MST)

The MST is used by the messaging engine to set the bitmask in STBs. It contains a stb_id field with a single STB ID value, and a bitmask field. When a STB with this ID receives the message, it must store the bitmask.

Channel Filtering Table (CFT)

The CFT table contains a list of channel IDs. All the STBs read this message and store the channel filtering table, or updates the local copy according to the new definition in the newest channel filtering table. If an STB receives a message while viewing a channel with an ID in this table, it will not show the message. The STB should wait until the user switches to an unfiltered channel to show the message.

Video Recording Table (VRT)

The VRT table is used by the messaging engine to send PVR commands to one or more STBs. Specifically, it allows the TV operator to send commands (e.g., on behalf of the subscriber) to schedule the recording of any channel on a given timespan, or other events. Additional description is provided herein. The table contains an address field, as described before. It also includes a section for the PVR command and parameters.

VRT messages, thus, include commands for the PVR component. Some possible commands include, but are not limited, to, pairing the PVR with the underlying subscriber, recording a given channel over a given time range, accessing a recording, and deleting a recording.

The TV operator may decide to open a restricted version of these features to subscribers. For example, a subscriber could access a set of commands to be sent to his STB (but not to others). Alternatively, the service may be available through a telephone line where one or more of an interactive program, a voice-recognition software or a human being, interacts with the calling subscriber and issues the messaging-application PVR commands himself.

The PVR protocol is a protocol specific to embodiments of this invention. It allows subscribers to first pair a mobile device with the PVR component within the STB, and then send recording commands to the PVR. The mobile device must have a camera.

The pairing procedure within the protocol is a three-parties protocol executed between TV operator application, the STB and a mobile application that runs in a mobile device (e.g., phone, tablet, or even a laptop) which has a camera:

1. The subscriber uses the remote control to select the pairing option in the STB menu.
2. The application displays a QR code which encodes a message encrypted using a predefined encryption system (e.g., the XTEA cipher) with a shared key. The message contains information for this STB. This information may include but be not limited to its vendor, model, serial number, and subscriber ID.
3. The subscriber opens the mobile application and is immediately asked to aim the camera at the QR code. Once the QR code has been read by the application, the subscriber is notified and the information is sent to the TV operator's application.
4. The TV operator's application then generates a challenge (e.g., a random number) and sends this to the STB.
5. The STB receives this new message (in a VRT table) which includes information to finalize the pairing. This is read by the STB application within the STB which displays a QR code that encodes this number. The user must again aim the camera of his mobile device to this QR code to finalize the pairing. (This random number is a shared secret between the mobile application and the TV operator application. The next time the mobile application wants to send a command to the TV operator application, e.g., to schedule a show, it will use this shared secret to identify itself.)

Once paired, the subscriber can open the mobile application and select any of the following tasks: schedule a new video recording on the STB, cancel a previously scheduled recording, delete a stored video recording, cancel all video recording tasks, configure a notification for a recording or an event.

Receiving Messages in the Set-Top Boxes

As previously mentioned, the multiplexor includes message signals in the broadcasted signal (block 406). Next, according to the present system and method, STB vendors modify (by adding functionality) the firmware in the STBs. This is typically done by: A) the manufacturers getting a detailed description of the functionality and implementing the new functions, and B) the manufacturers providing the TV operators with validated versions of the firmware including these modifications.

As shown by FIG. 4, the STB extracts the message signal (block 408) and the STB application extracts a message and compares type and address, opening the message (block 410). The following provides further description.

The additions to the STB are done so that, first, the STB identifies the channel IDs for the message signals. Hence, when the STB demultiplexes the broadcasted signal, it isolates the messaging signals and feeds them to a special-purpose application which is part of the additions, referred to herein as the STB message application, or simply STB application, which is in charge of reading message signals, selecting and displaying messages intended for the subscriber, and other tasks.

The STB application undergoes through the following states. When the STB is turned on it starts unloaded, and is immediately loaded. Once the messaging application is loaded, it starts an initialization procedure, in which it reads tables stored in memory, and immediately is placed in a waiting state; it waits for messages or subscriber input (e.g., from the remote control).

Subscriber input: The subscriber can interact with the application from the STB menu, e.g., using the remote control, to access the message input, mark messages as read and other tasks described later.

Messages signal: The messages signal encodes a sequence of tables. For example, of the six types previously described. Each table can have one or more sections. The section format is specified a priori so that both messaging application (in the TV operator's end) and STB application (in the STB's end) share the same specification. In particular, all tables may start with a two bytes string which identifies the table type. For example these table types can be defined with the strings 0xF0, 0xF1, 0xF2, 0xF3, 0xF4, 0xF5.

When the STB application reads a table, the first thing it does is check its table type. It may store the templates MTT and filters tables (CFT). If it is an IMT, MRT, VRT or MST, then the STB application checks the address of the message to decide whether the underlying message is intended for this STB.

The STB Addressing Procedure

The addressing procedure allows an STB to decide whether it is the recipient of a message it received (it can be a message from an IMT, a MTT or other tables).

Whenever the addressing procedure is called the procedure checks for the following conditions in order to decide if a message is destined to the STB running the procedure:
  The message is of the broadcast address type.
  The message is of the single address type and the address data is equal to the STB's ID.
  The message is of the range address type and the ID of the STB falls within the range.
  The message is of the bitmask type and the bitmask value in the message is equal to the bitmask stored in the STB.

The message type, address data and other information attributes are all extracted from the table. If any of the above conditions holds true, then the procedure returns TRUE meaning that the message is addressed to the STB running the procedure, or else it returns FALSE. If TRUE, the message is processed.

Message Assembly

Whenever an IMT or MRT address an STB, the STB application must assemble a message to be displayed. A message includes a sequence of descriptors as described earlier. This specification allows for the unequivocal assembly of messages.

In an alternative embodiment, the message includes a sequence of message descriptors. According to this embodiment, there is a first descriptor tag for a title, a second tag for the text body and a third tag for the footer. There is also a compression tag. Setting the one-bit compression tag to 1 specifies that the message content has been compressed (using a pre-specified algorithm) and indicates the assembly tool should first uncompress this content during assembly.

Messages include a Message ID descriptor. When a message is displayed, or in any case processed, the STB application stores this message ID for later use. In particular, if the STB application receives a message with this same message ID, the message may be ignored.

Messages in the IMT and MRT tables include a message type descriptor. For example, the following four types can be defined and pre-configured: stored, popup, scroll and non-removable. A message of type stored remains in the STB memory and can be viewed at any time in the Inbox application (described later). A message of type popup (where the removal descriptor is set to TRUE) includes an icon that allows its removal, while a message of type non-removable does not include the icon and cannot be removed by the subscriber. A message of type scroll allows the subscriber to scroll up and down to read the message.

The assembly starts with the title. The procedure looks for the descriptor tag associated to the message title, then reads the length, call this N, and then uses the next N bytes of data to define the title. This text and any other text can be assumed, for example, to be in the UTF-8 encoding.

Then the assembly procedure looks up the body descriptor within the table, in a similar fashion as with the title (e.g., looks for the text body descriptor tag, then retrieves the text in this descriptor), appends the text body to the message it is assembling. If the text comes in several sections, then it waits until all the sections have been received to assemble and display. Next it follows a similar procedure to retrieve and append the text footer.

Moreover, the message includes any formatting tags, then the assembly procedure follows specification for these.

For example, the invention may be implemented to allow the following behavior. If the text (title, body or footer) includes a backslash (see table 1), then the next character is interpreted as a command and the following character (or characters) are interpreted as command parameters. Each command has a predefined command parameter length, as shown by Table 1:

TABLE 1

| Marker | Description |
|---|---|
| \ | Tag marker |
| x | Command |
| y | Command parameter |

These tags (and similar tags) can be used to define font size, font type, font color, and other text formatting options. For example, assume that \fx is used to specify a font size (x being a single character). Specifically, in this example \f0 specifies the regular font, \f1 specifies the small font, \f2 specifies the large font, \f3 specifies regular bold font, and so on and so forth. Hence, whatever comes after one of these commands, such as \f3, is to be printed using the specified font (regular bold).

Commands can be used for font size, font type, font color, foreground color, background color, text alignment, starting a new page, defining a table, row width, or even defining parameters (for templates). In case the message is assembled from a template and it includes parameters, it is at this step that parameters are replaced by their instantiated values. The replacement method is quite simple, in the MTT template the placeholders are indexed and in the MTR there is each parameter descriptor includes an index and a value; hence, the template indices within the MTT text are replaced by the value associated with this index in the MTR.

If the message is of the popup type (i.e., if the "message type" descriptor, the assembly procedure adds to the footer an icon and a message indicating that the user should press "OK" key in the remote control to continue).

Finally, other fields and descriptors define how this message is to be displayed.

Six Table Types

When an Individual Message Table is received, the STB calls the addressing procedure to decide whether it must open the message. In case the message is addressed to this STB, then the STB application follows the message assembly procedure in order to display the message.

If the message is of the removable type, and the subscriber has marked the message as viewed, then the STB stores this information internally. If the message is marked to be stored in an inbox, then this is done.

Before displaying the message, the STB must check that the current channel is not in the filtering table. If this happens, then the message is not displayed. As soon as the subscriber changes the channel to one outside of the filtering table, the STB displays the message.

When a Message Templates Table is received, the STB updates its local copy of message templates. The STB application then reads the template ID from the table, the template version, and updates the local copy of the template if the received version is newer than the local copy. Note that a message template may include descriptors other than the text content; for example, those specifying if the message is popup (removable) or non-removable, its scrolling and pagination settings, et cetera. These are stored as part of the message.

When a Message Recipient Table is received, the STB executes the addressing procedure to decide whether the message is destined to this STB. In case it is, it checks the template ID, makes sure the same version that is in store is the one specified in the MRT, and looks up for the template. It then calls the assembly procedure as described above.

If the message is of the removable type, and the subscriber has marked the message as viewed, then the STB stores this information internally. If the message is marked to be stored in an inbox, then this is done.

Before displaying the message, the STB must check that the current channel is not in the filtering table. If this happens, then the message is not displayed. As soon as the subscriber changes the channel to one outside of the filtering table, the STB displays the message.

The Video Recording Table for transmission of PVR messages. When a VRT table is received, the addressing procedure is used to decide if the message is destined to this STB. If it is, then the message is interpreted according to the PVR protocol specification which follows below.

When a Message Subscription Table is received, the STB checks if the target address agrees with its STB ID. If this happens, it stores the bitmask in local storage.

When a Channel Filtering Table is received, the STB updates the locally stored filtering table. This table contains a list of channel IDs.

The Inbox

An inbox module within the messaging application is used to allow the user to view the messages received by the STB. When the user accesses his inbox, he is shown a collection of inbox folders and for each folder a list of messages in this folder (recall that each message has a message inbox descriptor in which the ID of the inbox is specified). For each message he sees the title. If he selects one message from these lists, then the complete message is displayed.

These lists, of course, only include the messages that have not been removed by the TV operator, and they are only viewable in the time range specified in the message schedule descriptor.

While the above description demonstrates portions and functionality of the messaging engine, multiplexor, STBs and other devices or systems, it is noted that a system may be provided as a computer having the additional portions described hereinabove. For instance, the multiplexor would use multiple audio/video peripherals, and an STB would require a smartcard reader or other peripheral, etc. In such embodiments, general portions of a system may be provided as described below. The system may contain a processor, a storage device, a memory having software as previously described stored therein that defines the abovementioned functionality, input and output (I/O) devices (or peripherals), and a local bus, or local interface allowing for communication within the system. The local interface can be, for example but not limited to, one or more buses or other wired or wireless connections, as is known in the art. The local interface may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor is a hardware device for executing software, particularly that stored in the memory. The processor can be any custom made or commercially available single core or multi-core processor, a central processing unit (CPU), an auxiliary processor among several processors associated with the present system, a semiconductor based microprocessor (in the form of a microchip or chip set), a macroprocessor, or generally any device for executing software instructions.

The memory can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory may incorporate electronic, magnetic, optical, and/or other types of storage media. Note that the memory can have a distributed architecture, where various components are situated remotely from one another, but can be accessed by the processor.

The software defines functionality performed by the system, in accordance with the present invention. The software in the memory may include one or more separate programs, each of which contains an ordered listing of executable instructions for implementing logical functions of the system, as described below. The memory may contain an operating system (O/S). The operating system essentially controls the execution of programs within the system and provides scheduling, input-output control, file and data management, memory management, and communication control and related services.

The I/O devices may include input devices, for example but not limited to, a keyboard, mouse, scanner, microphone, smartcard reader, etc. Furthermore, the I/O devices may also include output devices, for example but not limited to, a printer, display, etc. Finally, the I/O devices may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system is in operation, the processor is configured to execute the software stored within the memory, to communicate data to and from the memory, and to generally control operations of the system pursuant to the software, as explained above.

When the functionality of the system is in operation, the processor is configured to execute the software stored within the memory, to communicate data to and from the memory, and to generally control operations of the system pursuant to the software. The operating system is read by the processor, perhaps buffered within the processor, and then executed.

When the system is implemented in software, it should be noted that instructions for implementing the system can be stored on any computer-readable medium for use by or in connection with any computer-related device, system, or method. Such a computer-readable medium may, in some embodiments, correspond to either or both the memory or the storage device. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system is implemented in hardware, the system can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed:

1. A method for implementing communications between a TV operator's infrastructure and set-top boxes (STBs) through a TV operator's infrastructure, the infrastructure including at least one Conditional Access System (CAS), a messaging engine and a Set Top Box (STB), the STB including a unique identification value, the method comprising the steps of:

receiving a structured message in the messaging engine;

computing a stream out of multiple received structured messages by the messaging engine and sending to the multiplexor;

including the stream of structured messages in a broadcasted signal transmitted through the TV operator's infrastructure;

receiving the broadcasted signal by the STB and extracting a structured message;

comparing addressing information in the extracted structured message with a unique identification of the STB;

comparing a message type of the message and storing the message if it is of a type "template", wherein the message template includes an ID;

receiving a second message of a type "instantiated template" including a template ID and identified parameters; and assembling the message by replacing parameter identifiers in the first message with the identified parameters in the second message.

2. The method of claim 1, further comprising the step of displaying the message.

3. A method for implementing communications between a TV operator's infrastructure and set-top boxes (STBs) through a TV operator's infrastructure, the infrastructure including at least one Conditional Access System (CAS), a messaging engine and a Set Top Box (STB), the STB including a unique identification value, the method comprising the steps of:

receiving a structured message in the messaging engine;

computing a stream out of multiple received structured messages by the messaging engine and sending to the multiplexor;

including the stream of structured messages in a broadcasted signal transmitted through the TV operator's infrastructure;

receiving the broadcasted signal by the STB and extracting a structured message;

comparing addressing information in the extracted structured message with a unique identification of the STB;

receiving a first message of the type "filtering list" by the STB and storing the list;

receiving a second message comparing the channel that is currently selected with the filtering list; and querying the STB for what is the selected channel and not displaying any message if the channel is in the filtering list.

* * * * *